United States Patent
Hong et al.

(10) Patent No.: US 10,581,271 B2
(45) Date of Patent: Mar. 3, 2020

(54) INCENTIVE-BASED DEMAND RESPONSE METHOD CONSIDERING HIERARCHICAL ELECTRICITY MARKET

(71) Applicant: Seung Ho Hong, Seoul (KR)

(72) Inventors: Seung Ho Hong, Seoul (KR); Mengmeng Yu, Ansan-si (KR)

(73) Assignee: Seung Ho Hong, Seoul (KR)

( * ) Notice: Subject to any disclaimer, the term of this patent is extended or adjusted under 35 U.S.C. 154(b) by 113 days.

(21) Appl. No.: 15/708,581

(22) Filed: Sep. 19, 2017

(65) Prior Publication Data

US 2018/0083483 A1    Mar. 22, 2018

(30) Foreign Application Priority Data

Sep. 22, 2016  (KR) .................. 10-2016-0121544
Aug. 11, 2017  (KR) .................. 10-2017-0102362

(51) Int. Cl.
| | | |
|---|---|---|
| *H02J 13/00* | (2006.01) | |
| *G06F 17/11* | (2006.01) | |
| *G05B 15/02* | (2006.01) | |
| *G06Q 30/02* | (2012.01) | |

(52) U.S. Cl.
CPC .......... *H02J 13/0006* (2013.01); *G05B 15/02* (2013.01); *G06F 17/11* (2013.01); *H02J 13/0017* (2013.01); *H02J 13/0079* (2013.01); *G06Q 30/0202* (2013.01); *Y02B 90/2607* (2013.01); *Y04S 40/12* (2013.01)

(58) Field of Classification Search
CPC ......... G05B 15/02; G06F 17/11; G06F 17/18; G06Q 30/0202; G06Q 30/0206; G06Q 30/0211; G06Q 30/0226; H02J 13/0006; H02J 13/0017; H02J 13/0079
USPC ....................................................... 700/291
See application file for complete search history.

(56) References Cited

U.S. PATENT DOCUMENTS

| | | | | |
|---|---|---|---|---|
| 8,359,124 B2* | 1/2013 | Zhou | ................ | G05B 13/024 |
| | | | | 700/276 |
| 8,521,337 B1* | 8/2013 | Johnson | ................ | H02J 3/008 |
| | | | | 700/297 |

(Continued)

FOREIGN PATENT DOCUMENTS

| | | |
|---|---|---|
| KR | 10-1133934 B1 | 4/2012 |
| KR | 10-1472582 B1 | 12/2014 |

(Continued)

*Primary Examiner* — Chun Cao
(74) *Attorney, Agent, or Firm* — Rabin & Berdo, P.C.

(57) ABSTRACT

An incentive-based demand response (DR) method and system are provided from the view of a grid operator (GO) to enable system-level dispatch of DR resources. The method spans three hierarchical levels of a GO, multiple service providers (SPs), and corresponding customers. The GO first posts an incentive to SPs, who will then invoke sub-programs with enrolled customers to negotiate quantities of demand reduction via providing SP incentives. In view of the hierarchical decision-making structure, a two-loop Stackelberg game is proposed to capture interactions between different actors. The existence of a unique Stackelberg equilibrium that provides optimal system solutions is demonstrated. Simulation results show that the proposed method is effective in helping compensate system resource deficiency at minimum cost.

7 Claims, 10 Drawing Sheets

(56) References Cited

U.S. PATENT DOCUMENTS

| | | | | |
|---|---|---|---|---|
| 2011/0137591 A1* | 6/2011 | Ishibashi | ............... | G06Q 10/04 |
| | | | | 702/60 |
| 2012/0078687 A1* | 3/2012 | Ghosh | ............... | G06Q 30/0207 |
| | | | | 705/14.1 |
| 2014/0324532 A1* | 10/2014 | Ghosh | ............... | G06Q 30/0202 |
| | | | | 705/7.31 |
| 2017/0060109 A1* | 3/2017 | Ghosh | ................... | G06Q 50/06 |
| 2017/0075321 A1* | 3/2017 | Longet | ................... | G01C 11/02 |
| 2017/0371308 A1* | 12/2017 | Ghosh | ................... | G06Q 50/06 |

FOREIGN PATENT DOCUMENTS

| | | | |
|---|---|---|---|
| KR | 10-2015-0048601 A | | 5/2015 |
| KR | 10-1557080 B1 | | 10/2015 |

* cited by examiner (a)

(b)

(a) SP1

(b) SP2

INCENTIVE-BASED DEMAND RESPONSE METHOD CONSIDERING HIERARCHICAL ELECTRICITY MARKET

CROSS-REFERENCE TO RELATED APPLICATIONS

This application is based upon and claims the benefit of priority from the prior Korean Patent Application No. 10-2016-0121544, filed on Sep. 22, 2016, with the Korean Intellectual Property Office, the disclosure of which is incorporated herein in its entirety by reference.

TECHNICAL FIELD

The present disclosure relates to an incentive-based demand response technologies applied with a Stackelberg Game between the main bodies of hierarchy considering the hierarchical electricity market.

BACKGROUND

Ever increasing electricity demand has placed a huge burden on power grids. Conventionally, generation is usually forced to follow varying loads in power systems. To compensate for capacity shortage during peak times, grid operators (GOs) are required to build more backup generation capacity. However, this conventional approach has faced criticism for a range of reasons, including heavy investment, underutilization of generators during off-peak times, and carbon emission issues. In addition, the growing penetration of renewable resources (e.g., wind and solar energy) has brought new challenges to power grid management due to their intermittent generation. As a result, GOs must leverage various means to accommodate their intermittence, and there is thus some hesitation in relying on renewable energy systems to compensate for system resource deficiencies during peak hours.

With the advent of the smart grid, demand response (DR) now plays a more active role in improving grid efficiency and reliability, as it introduces the ability to react quickly to supply-demand mismatch by adjusting flexible loads on the demand side.

The appropriate utilization of demand side resources can reduce the need to build expensive backup generators and help to accommodate further penetration of intermittent renewable generation. As a main branch of DR programs, incentive-based programs (IBPs) rely on contractual arrangements designed by policymakers (GOs or utilities) to elicit demand reductions from customers during program "events", which might be triggered in response to a price spike or a system contingency that threatens power system reliability. IBPs provide enrolled customers with incentives to reduce their load that are separate from, or additional to, the retail electricity rate.

Although the history of DR resource participation began with individual utility programs, recent research demonstrates that there is greater underlying significance from DR resources if they can be directly dispatched by a regional system operator. The experience of the California Independent System Operation (CAISO) scheme shows that the inability of CAISO to dispatch DR resources directly has limited the growth of DR. In this regard, transitioning DR resources from utility-designed programs to system operator-controlled programs is expected to improve the effectiveness and efficiency of power system operation. However, proper mechanisms or financial incentives to accomplish this transition are still absent. In other words, effective compensation mechanisms are needed to reflect the value of DR in the wholesale market, from the view of a GO.

Related technologies are described in, for example, Korean Patent No. 10-1133934.

SUMMARY

One of the objects of the present disclosure is to solve the problems described above and provide a system and method for an incentive-based DR that can compensate for the shortage of system resource with a minimum cost.

According to an aspect of the present disclosure, there is provided an incentive-based DR method in a DR system including a GO, a plurality of service providers (SPs), and a plurality of customers enrolling each SP. The method includes a first step of updating, by the GO, a GO incentive and transmitting the GO incentive that has been updated to the plurality of SPs; a second step of determining, by each of the plurality of SPs, an SP incentive based on the GO incentive and a characteristic of customers of its own; a third step of determining, by each of the plurality of SPs, a demand reduction of each of its own customers based on the SP incentive and transmitting a total demand reduction of subscription customers of its own to the GO; a fourth step of calculating, by the GO, a total procurement cost based on a total demand reduction received from the plurality of SPs and the GO incentive; and a fifth step of determining, by the GO, whether the total procurement cost reached a Stackelberg equilibrium state. When it is determined that the total procurement cost did not reach the Stackelberg equilibrium state, repeating the first to fifth steps, and when it is determined that the total procurement cost reached the Stackelberg equilibrium state, performing a DR by utilizing the GO incentive, the SP incentive, and the total demand reduction under the Stackelberg equilibrium state.

According to another aspect of the present disclosure, there is provided an incentive-based DR method in a DR system including a GO, a plurality of SPs, and a plurality of customers enrolling each SP. The method includes determining, by the GO, a GO incentive so as to minimize a procurement cost that is a sum of a power generation cost and a cost to be paid to the plurality of SPs; and determining, by each of the plurality of SPs, an SP incentive so as to maximize a value obtained by subtracting a cost to be paid to a plurality of customers of its own from a revenue acquired from the GO.

According to yet another aspect of the present disclosure, there is provided an incentive-based DR method of an SP participating in an electricity market of a GO between the GO and a plurality of customers. The method includes receiving a GO incentive from the GO; determining an SP incentive based on the GO incentive and a characteristic of customer; determining a demand reduction amount of each customer based on the SP incentive and the characteristic of customer; and calculating a total demand reduction amount by adding the demand reduction amount of each customer and transmitting calculated total demand reduction amount to the GO.

According to yet another aspect of the present disclosure, there is provided an incentive-based DR system. The system includes a memory and a processor coupled to the memory in which the processor is configured to, when the GO updates the GO incentive and sends updated GO incentive to the plurality of SPs, allow each of the plurality of SPs to determine an SP incentive based on a GO incentive and a characteristic of a customer of its own; and when each of the plurality of SPs determines a demand reduction of each customer of its own and sends a total demand reduction of enrolling customers of its own to the GO, allow the GO to calculate a total procurement cost based on a total demand reduction received from the plurality of SPs and the GO incentive and determine whether the total procurement cost reached a Stackelberg equilibrium state.

According to yet another aspect of the present disclosure, there is provided an incentive-based DR system including a GO server configured to determine a GO incentive so as to minimize a procurement cost that is a sum of a cost for additional power generation to deal with a shortening of resources and a cost to be paid to a plurality of SPs; and an SP server configured to determine an SP incentive so as to maximize a value obtained by subtracting a cost to be paid to a plurality of customers from a revenue obtained from the GO.

According to yet another aspect of the present disclosure, there is provided an SP server participating in an electricity market of a GO. The SP server includes a communication unit that receives a GO incentive from the GO and transmit a total demand reduction of enrolling customers to the GO; a determination unit that determines an SP incentive based on the GO incentive and a characteristic of customers; and a calculation unit that determines a demand reduction of each customer based on the SP incentive and the characteristic of customers, and calculates a total demand reduction amount by adding the demand reduction of each customer.

According to yet another aspect of the present disclosure, there is provided a GO server that manages an incentive-based DR for consumers of electric power through an SP. The GO server includes a memory and a processor coupled to the memory. In particular, the processor is configured to update a GO incentive and transmit updated GO incentive to the SP; and after receiving a total demand reduction amount of enrolling customers from the SP, determine whether a procurement cost reached a Stackelberg equilibrium in which the procurement cost can no longer be minimized. In particular, the procurement cost is obtained by adding a cost for additional power generation amount which is an amount of resource shortfall subtracted by the total demand reduction amount and a cost to be paid to the SP based on the total demand reduction amount and the GO incentive.

As described above, with the incentive-based DR method and system of the present disclosure, it is possible to dispatch the DR resources and properly reflect the value of the DR to the wholesale market.

Moreover, the incentive-based DR method and system of the present disclosure compensate for the system resource deficiencies with a minimum cost.

Additionally, as an extension of the present disclosure, the generator of supply side may compete with an SP by being handled individually to submit a bid in the wholesale market, and afterward, an aution process may determine the winningbidding price. As a result, a system operator may procure necessary resources with a minimum cost.

DESCRIPTION OF EMBODIMENTS

Figure 1:
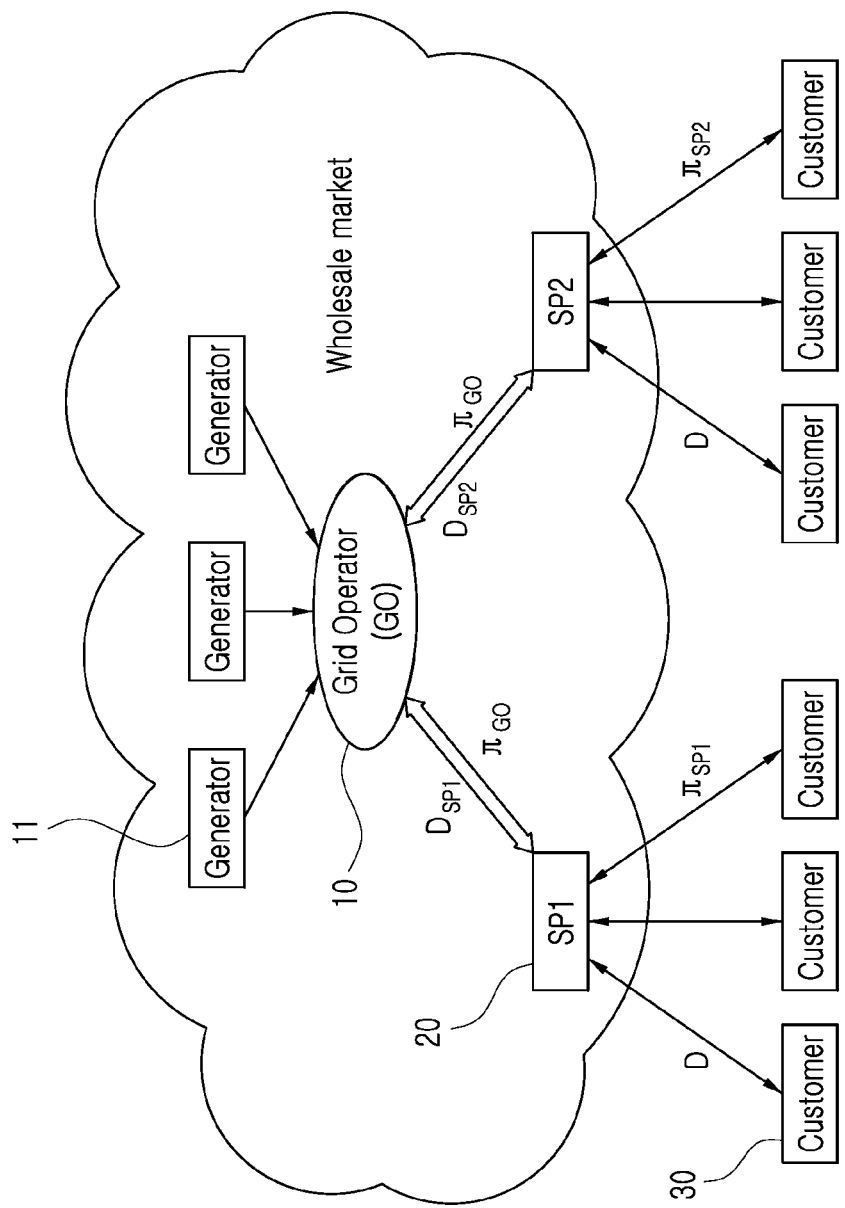
FIG. 1 is a view illustrating a schematic diagram of an incentive-based DR system according to the present disclosure.

There have been provided a method and system for transitioning DR resources from utility programs to system operator-controlled programs. Small-load customers who usually struggle to compete with large industrial customers to earn profit through trading load reductions in a wholesale electricity market are focused on in particular.

Moreover, the GO usually sets up a threshold of minimum load reduction before a DR resource is allowed to enter the wholesale market. One solution to this limitation is to enroll small-scale customers in sub-programs of service providers (SPs), where the SP acts as a speculator on behalf of its enrolled customers and takes part in the wholesale electricity market to sell aggregated load reduction, thus hedging small-load customers from exposure to the risks posed by competing with large-load customers.

To this end, the present disclosure introduces a novel incentive-based DR model spanning three hierarchical levels of a GO, multiple SPs, and corresponding enrolled customers, aiming to help the GO procure the required resource from the supply and demand sides at minimum cost. The contributions of the present disclosure may include: A novel market-oriented resource trading framework is proposed to enable system-level dispatch of DR resources; Mathematical models for each involved actor are properly defined by referring to their respective characteristics, wherein the inherent dependence between different actors is established by leveraging two types of incentive; and A two-loop Stackelberg game is proposed to capture the interactions between different actors; moreover, a particular Stackelberg equilibrium that provides optimal system solutions is proven to exist uniquely.

The present disclosure is organized as follows. Section I presents the incentive-based DR model, Section II provides the mathematical models for each corresponding actor, Section III formulates a two-loop Stackelberg game to capture the interactions between different actors together with analyses of the optimal outcome, and Section IV discusses the simulation results.

I. Incentive-Based DR Model

Intra-daily, the GO should foresee resource deficiencies (e.g., operating reserves) in an upcoming short period, and anticipate the required resource quantity accordingly. Conventionally, resource shortages are covered by flexible generators (e.g., diesel generators and gas turbines) that can be on-line quickly with negligible start-up cost. However, these generating units usually have quite high running costs that are deemed a huge financial burden from the view of the GO. Demand-side participation in the electricity market is considered to be helpful in alleviating this financial burden on the GO, and requires that load reduction provided by the demand side be awarded at regulated incentive rates.

The present introduces a novel incentive-based DR model aimed at helping the GO procure the required resource from generators and the demand side at minimum cost. The presented DR model includes mainly of three kinds of actor: the GO, SPs, and customers. The objective of each actor can be summarized as follows.

Objective of Grid Operator (GO)

The objective of the GO is to lower the cost to compensate for resource deficiency, either through running flexible generators as shown in FIG. 1, or through procuring load reduction from the demand side by offering a GO incentive to the demand side.

Objective of Service Provider (SP)

An SP is located between the GO and end-customers, as shown in FIG. 1, and runs a sub-program with its customers to induce them to sell demand reduction to it in exchange for providing them with incentive payments. On the other hand, an SP also takes part in the wholesale electricity market to sell the load reduction (aggregated from its enrolled customers) to the GO at the provided GO incentive.

Therefore, the objective of an SP is to maximize the revenue obtained by trading with the GO, while minimizing incentive payments to customers.

Objective of Customer

A customer is assumed to enroll in the sub-program of an SP, as shown in FIG. 1. When informed of the incentive by the SP, customers enrolled to this SP will try to maximize their incentive incomes while considering the incurred dissatisfaction cost to determine their optimal demand reduction quantities. Here, when a customer curtails their load, they will experience discomfort, and such discomfort is commonly modeled as the dissatisfaction cost.

Coordination Among GO, SPs, and Customers

The objectives of the three kinds of actor discussed above differ from each other, and are coordinated via two types of incentive: the GO incentive ($\pi_{GO}$) and the SP incentive ($\pi_{SP}$). As shown in FIG. 1, once the GO announces $\pi_{GO}$, each SP will trigger its sub-program with enrolled customers (by issuing $\pi_{SP}$) to encourage them to reduce demand (D), and then respond with the aggregated load reduction ($D_{SP}$) to the GO. In turn, after collecting the load reduction from all SPs, the GO calculates the total cost, which consists of two parts: incentive payments to SPs and running costs of generators. This process would be executed repeatedly until the system cost reaches a minimum.

II. Mathematical Models

Grid Operator (GO) Model

When anticipating the resource deficiency with the quantity $D_{req}$, the GO will try to compensate the deficiency either by running generators or purchasing load reduction from the demand side. Accordingly, the objective of a GO is to minimize the procurement cost ($C_{GO}$) composed of two parts: the generation cost caused by running generators and incentive payments paid to SPs.

$$\min C_{GO} = C_{Gen}(G) + \pi_{GO} \cdot \sum_{k \in K} D_{SP,k} \quad (1a)$$

$$\text{s.t.} \quad \pi_{GO}^{min} \le \pi_{GO} \le \pi_{GO}^{max} \quad (1b)$$

$$G + \sum_{k \in K} D_{SP,k} = D_{req} \quad (1c)$$

In (1a), $C_{Gen}(G)$ denotes the cost of generating power quantity G. $\pi_{GO}$ is the "incentive" offered by the GO, which is constrained by the lower and upper bounds in (1b). $D_{SP,k}$ is the corresponding load reduction submitted by the kth SP. Moreover, the sum of the generating quantity (G) and the load reduction submitted by all the SPs should be equal to $D_{req}$, as indicated by (1c).

$C_{Gen}(G)$ is assumed to be a monotonically increasing function of the generating quantity (G) and strictly convex. Without losing generality, $C_{Gen}(G)$ takes the following form:

$$C_{Gen}(G) = a \cdot (G)^2 + b \cdot (G) + c \quad (2)$$

where a, b, and c are the generation coefficients, which are available to the GO in advance.

Service Provider (SP) Model

Suppose more than one SP joins the wholesale market organized by the GO; let K be the set of SPs with number K=|K|. For an $SP_{k \in K}$, when offered the GO incentive ($\pi_{GO}$), it aims to maximize the revenue from trading with the GO in the wholesale market, while minimizing incentive payments to enrolled customers. Therefore, the objective of SP k would be a mixture of these factors, as given by the following:

$$\max_{\pi_{SP,k}} U_{SP,k} = \sum_{i \in N_k} D_{i,k} \cdot \pi_{GO} - \sum_{i \in N_k} D_{i,k} \cdot \pi_{SP,k} \quad (3a)$$

$$\text{s.t.} \quad \pi_{SP,k}^{min} \le \pi_{SP,k} \le \pi_{SP,k}^{max} \quad (3b)$$

In (3a), $D_{i,k}$ represents the demand reduction provided by customer i of SP k, and $N_k$ ($N_k=|N_k|$) denotes the set of customers that have enrolled to this SP. $\pi_{SP,k}$ is the incentive provided by the kth SP to incentivize customers to reduce demand. Constraint (3b) gives the lower and upper bounds of $\pi_{SP,k}$.

Correspondingly, for SP k, the load reduction ($D_{SP,k}$) in (1a) is the sum of demand reduction of all enrolled customers.

$$D_{SP,k} = \sum_{i \in N_k} D_{i,k} \quad (4)$$

Customer Model

For a customer $i \in N_k$, when provided with incentive $\pi_{SP,k}$ from SP k, the goal is to maximize his/her utility function as follows:

$$\max_{D_{i,k}} U_{i,k} = D_{i,k} \cdot \pi_{SP,k} - \mu_{i,k} \cdot \varphi_{i,k}(D_{i,k}) \quad (5a)$$

$$\text{s.t.} \quad 0 \le D_{i,k} \le D_{i,k}^{tar} - D_{i,k}^{min} \quad (5b)$$

In (5a), the first term represents the incentive income of customer i of SP k by providing demand reduction $D_{i,k}$; the second term is the incurred dissatisfaction cost $\varphi_{i,k}$, where $\mu_{i,k}>0$ is defined as the weight factor with respect to $\varphi_{i,k}$. Constraint (5b) regulates $D_{i,k}$ such that it does not exceed the available quantity, that is, the gap between the target demand ($D_{i,k}^{tar}$) and the minimum demand requirement ($D_{i,k}^{min}$) Here, $D_{i,k}^{tar}$ is the customer baseline (CB), that is, the power consumption level from which the demand reduction is calculated. In practice, the CB should be determined by the SP using some specific method (e.g., utilize historical power consumption data or sign contracts with customers), but the details of computation of the customer baseline are beyond the scope of this paper. In addition, $D_{i,k}^{min}$ should be determined by each customer depending on his/her own characteristic or requirement.

The dissatisfaction cost function $\varphi_{i,k}$ in (5a) models the degree of discomfort that a customer might experience when reducing demand, which is defined to be convex, namely, dissatisfaction will increase dramatically with a greater reduction in demand:

$$\varphi_{i,k}(D_{i,k}) = \frac{\theta_{i,k}}{2}(D_{i,k})^2 + \lambda_{i,k} \cdot D_{i,k} \quad \theta_{i,k} > 0 \; \lambda_{i,k} > 0 \tag{6}$$

In (6), $\theta_{i,k}$ and $\lambda_{i,k}$ are customer-dependent parameters, where $\theta_{i,k}$ reflects the attitude of a customer with respect to the provision of demand reduction: a greater value of $\theta_{i,k}$ implies that this customer holds a more conservative attitude toward providing demand reduction, and vice versa.

III. Formulation of Two-Loop Stackelberg Game

Game Formulation

When examining the objective functions (1a), (3a) and (5a) of each actor in Section III, it can be found that optimizing each objective function will result in a trade-off between two terms, for example, minimizing the generation cost in (1a) needs the GO to provide greater incentive to SPs, which in turn will cause the payments to SPs to increase. Similarly, maximizing (3a) needs each SP to make a compromise between the revenue from trading with the GO in the wholesale market and payments to customers. In addition, maximizing (5a) will also result in a trade-off between "incentive income" and "dissatisfaction cost", since more demand reduction will increase "incentive income" but also exacerbate dissatisfaction.

In this regard, the incentive provided by the GO will affect the quantity of aggregated demand reduction of an SP, and the incentive provided by an SP will also affect how customers determine their demand reductions; conversely, the adjusted demand reductions of customers will inversely affect how an SP regulates a new incentive, and also has an impact on the total procurement cost of the GO since the aggregated load reduction from SPs is altered. These factors naturally lead to interactions between these actors, which are coordinated via two types of incentive: the GO incentive ($\pi_{GO}$) and the SP incentive ($\pi_{SP,k}$).

Figure 2:
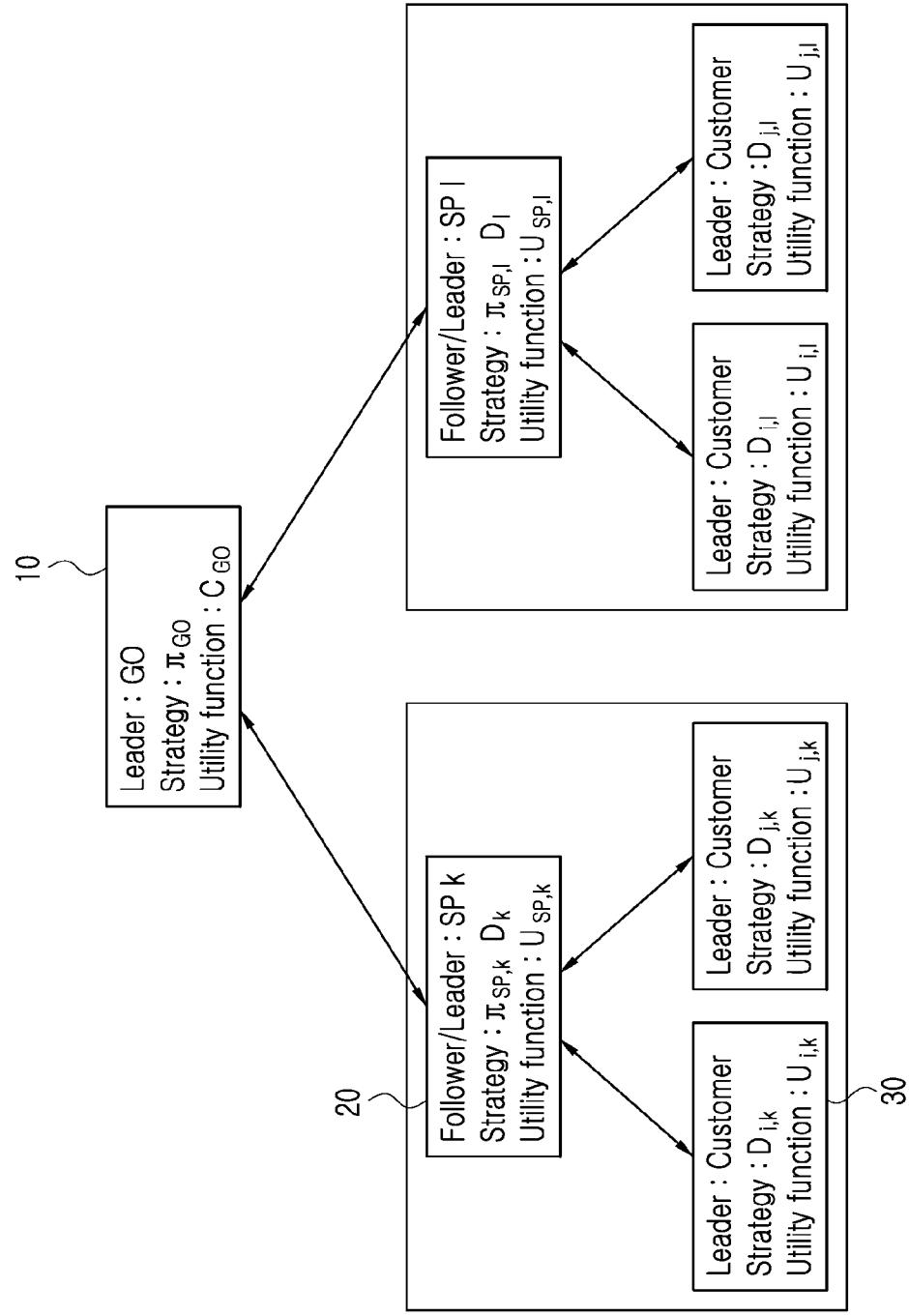
FIG. 2 is a view illustrating a 2-loop Stackelberg game in the incentive-based DR system according to the present disclosure.

The Stackelberg game is suitable for illustrating such a hierarchical decision-making framework. In this paper, a two-loop Stackelberg game is proposed to capture the concept behind the presented model. It is notable that an SP plays a dual role in the two-loop game. As shown in FIG. 2, on one hand, SPs act as followers of the leader GO in the higher loop of the game; on the other hand, each SP serves as a leader in the lower loop of the game with customers being followers. For this two-loop Stackelberg game with a hierarchical decision-making structure, the desired outcomes take the form of a Stackelberg equilibrium (SE), which is defined as follows:

Definition: For the two-loop Stackelberg game above, a set of strategies ($D^*, \pi^*_{SP}, \pi^*_{GO}$) constitutes an SE of this game, if and only if the following set of inequalities are satisfied:

$$U_{i,k}(D^*_k, \pi^*_{SP,k}) \geq U_{i,k}(D_{i,k}, D^*_{-i,k}, \pi^*_{SP,k}) \quad \forall i \in N_k \tag{7}$$

and $$U_{SP,k}(D^*_k, \pi^*_{SP,k}, \pi^*_{GO}) \geq U_{SP,k}(D^*_k, \pi_{SP,k}, \pi^*_{GO}) \quad \forall k \in K \tag{8}$$

as well as $$C_{GO}(D^*, \pi^*_{SP}, \pi^*_{GO}) \leq C_{GO}(D^*, \pi^*_{SP}, \pi_{GO}) \tag{9}$$

where $D^*_{-i,k} = [D^*_{1,k}, D^*_{2,k}, \ldots, D^*_{i-1,k}, D^*_{i+1,k}, \ldots, D^*_{N_k,k}]$ denotes the strategies of all customers under SP k except customer i; thus, all customers' strategies under SP k can be expressed as $D^*_k = [D^*_{i,k}, D^*_{-i,k}]$, and accordingly, $D^* = [D^*_1, D^*_2, \ldots, D^*_K]$ represents the union of customers' strategies from all SPs. In addition, $\pi^*_{SP} = [\pi^*_{SP,1}, \pi^*_{SP,2}, \ldots, \pi^*_{SP,k}]$ denotes the strategies of all SPs.

The inequalities in (7)-(9) signify that, when all players are at an SE, no customer can increase his/her utility by choosing a different strategy other than $D^*_{i,k}$, and no SP can improve its utility by deviating to other strategies; in addition, the GO cannot further reduce its cost by choosing other incentives.

Existence and Uniqueness of SE

Owing to the hierarchical structure of the game, its equilibrium can be deduced using backward induction.

The first step is to identify the "best response" of customers in responding to the SP strategy (i.e., $\pi_{SP,k}$) in the lower loop of the game; given each customer's "best response", the next step is to find an SP's best strategy. Upon the information revealed from all SPs, the third step is to check the existence of a best strategy for the GO. In the following, a theorem is proposed to verify the existence of the SE together with the analysis process.

Theorem 1: A unique SE exists in the proposed two-loop Stackelberg game, upon which the optimal solutions for the GO, SPs, and respective customers are determined.

Proof: a) Identify the "Best Response" of Customers in Responding to the SP Strategy $\pi_{SP,k}$.

Given the leader's strategy $\pi_{SP,k}$, the best-response function of customer i under SP k can be obtained by taking the first-order derivative of $U_{i,k}(D_k, \pi_{SP,k})$ in (5a) with respect to $D_{i,k}$:

$$\frac{\partial U_{i,k}(D_k, \pi_{SP,k})}{\partial D_{i,k}} = \pi_{SP,k} - \mu_{i,k} \cdot \theta_{i,k} \cdot D_{i,k} - \mu_{i,k} \cdot \lambda_{i,k} \tag{10}$$

By taking (10) to be zero, the best-response function can be obtained as follows:

$$D_{i,k} = \frac{\pi_{SP,k} - \mu_{i,k} \lambda_{i,k}}{\mu_{i,k} \theta_{i,k}} \tag{11}$$

Furthermore, the second-order derivative of $U_{i,k}(D_k, \pi_{SP,k})$ is calculated to be:

$$\frac{\partial^2 U_{i,k}(D_k, \pi_{SP,k})}{\partial D_{i,k}^2} = -\mu_{i,k} \theta_{i,k} < 0 \tag{12}$$

The value of (12) is always negative due to (6), meaning that $U_{i,k}(D_k, \pi_{SP,k})$ is strictly concave in the feasible region of $D_{i,k}$; thus, the best-response strategy in terms of (11) is guaranteed to be optimal and unique.

b) Find an SP's Best Strategy $\pi^*_{SP,k}$ Given Customers' Identified Best Responses According to the backward induction principle, this step finds an SP's best strategy, given followers' best-response strategies in the form of (11). By substituting (11) into the SP's objective function in (3a), $U_{SP,k}$ can be reformulated as:

$$U_{SP,k}(D_k, \pi_{SP,k}, \pi_{GO}) = \qquad (13)$$

$$\sum_{i \in N_k} \frac{\pi_{SP,k} - \mu_{i,k}\lambda_{i,k}}{\mu_{i,k}\theta_{i,k}} \cdot \pi_{GO} - \sum_{i \in N_k} \frac{\pi_{SP,k} - \mu_{i,k}\lambda_{i,k}}{\mu_{i,k}\theta_{i,k}} \cdot \pi_{SP,k} =$$

$$-\pi_{SP,k}^2 \sum_{i \in N_k} \frac{1}{\mu_{i,k}\theta_{i,k}} +$$

$$\pi_{SP,k}\left(\pi_{GO}\sum_{i \in N_k}\frac{1}{\mu_{i,k}\theta_{i,k}} + \sum_{i \in N_k}\frac{\lambda_{i,k}}{\theta_{i,k}}\right) - \pi_{GO}\sum_{i \in N_k}\frac{\lambda_{i,k}}{\theta_{i,k}}$$

By taking the first-order derivative of $U_{SP,k}(D_k, \pi_{SP,k}, \pi_{GO})$ in (13):

$$\frac{\partial U_{SP,k}(D_k, \pi_{SP,k}, \pi_{GO})}{\partial \pi_{SP,k}} = \qquad (14)$$

$$-2 \cdot \pi_{SP,k} \sum_{i \in N_k} \frac{1}{\mu_{i,k}\theta_{i,k}} + \pi_{GO}\sum_{i \in N_k}\frac{1}{\mu_{i,k}\theta_{i,k}} + \sum_{i \in N_k}\frac{\lambda_{i,k}}{\theta_{i,k}}$$

If (14) is set equal to zero, the best strategy $\pi^*_{SP,k}$ of SP k can be obtained as follows:

$$\pi^*_{SP,k} = \frac{1}{2}\pi_{GO} + \frac{1}{2}\frac{\sum_{i \in N_k}\frac{\lambda_{i,k}}{\theta_{i,k}}}{\sum_{i \in N_k}\frac{1}{\mu_{i,k}\theta_{i,k}}} \qquad (15)$$

By taking the second derivative of $U_{SP,k}(D_k, \pi_{SP,k}, \pi_{GO})$ with respect to $\pi_{SP,k}$, the following is obtained:

$$\frac{\partial^2 U_{SP,k}(D_k, \pi_{SP,k}, \pi_{GO})}{\partial \pi_{SP}^2} = \sum_{i \in N_k} -\frac{2}{\mu_{i,k}\theta_{i,k}} < 0 \qquad (16)$$

The value of (16) is always negative due to (6), implying that the reformulated objective function of the SP in (13) is strictly concave, which further confirms that the best strategy in terms of (15) is optimal and unique for SP k.

c) Verify the Existence of a Best Strategy for the GO Using the Revealed Information from all the SPs Note that the equation in (15) indicates that an SP's best strategy is a function of the GO's strategy; meanwhile, it also reflects the characteristics of its customers, as shown by the last term in (15), which coincides with the original intention of an SP—to act as a speculator on behalf of its enrolled customers and then take part in the wholesale electricity market to sell the load reduction aggregated from its customers. Upon the information revealed from each SP in the form of (15), this step aims to verify the existence of a best strategy for the GO. Regarding this, the objective of the GO in (1a) is reformulated according to the following sub-steps.

By substituting (15) into the customer's best response function in (11), the optimal demand reduction $D^*_{i,k}$ of customer i under SP k can be expressed as follows:

$$D^*_{i,k} = \frac{1}{2}\frac{\pi_{GO}}{\mu_{i,k}\theta_{i,k}} + \frac{1}{2}\frac{\sum_{i \in N_k}\frac{\lambda_{i,k}}{\theta_{i,k}}}{\sum_{i \in N_k}\frac{1}{\mu_{i,k}\theta_{i,k}}} \cdot \frac{1}{\mu_{i,k}\theta_{i,k}} - \frac{\lambda_{i,k}}{\theta_{i,k}} \qquad (17)$$

$$= \frac{1}{2}\frac{\pi_{GO}}{\mu_{i,k}\theta_{i,k}} + \frac{1}{2}\frac{\sum_{i \in N_k}\frac{\lambda_{i,k}}{\theta_{i,k}}}{\sum_{i \in N_k}\frac{1}{\mu_{i,k}\theta_{i,k}}} \cdot \frac{1}{\mu_{i,k}\theta_{i,k}} - \frac{\lambda_{i,k}}{\theta_{i,k}}$$

Accordingly, the aggregated demand reduction of $N_k$ customers under SP k can also be obtained:

$$D^*_{SP,k} = \sum_{i \in N_k} D^*_{i,k} \qquad (18)$$

$$= \frac{\pi_{GO}}{2}\sum_{i \in N_k}\frac{1}{\mu_{i,k}\theta_{i,k}} +$$

$$\frac{1}{2}\sum_{i \in N_k}\frac{\lambda_{i,k}}{\theta_{i,k}} \cdot \frac{1}{\sum_{i \in N_k}\frac{1}{\mu_{i,k}\theta_{i,k}}} \cdot \sum_{i \in N_k}\frac{1}{\mu_{i,k}\theta_{i,k}} - \sum_{i \in N_k}\frac{\lambda_{i,k}}{\theta_{i,k}}$$

$$= \frac{\pi_{GO}}{2}\sum_{i \in N_k}\frac{1}{\mu_{i,k}\theta_{i,k}} - \frac{1}{2}\sum_{i \in N_k}\frac{\lambda_{i,k}}{\theta_{i,k}}$$

Furthermore, the total demand reduction from all SPs will take the following form:

$$\sum_{k \in K} D^*_{SP,k} = \sum_{k \in K}\sum_{i \in N_k} D^*_{i,k} \qquad (19)$$

$$= \frac{\pi_{GO}}{2}\sum_{k \in K}\sum_{i \in N_k}\frac{1}{\mu_{i,k}\theta_{i,k}} - \frac{1}{2}\sum_{k \in K}\sum_{i \in N_k}\frac{\lambda_{i,k}}{\theta_{i,k}}$$

Note that the summation parts in (19) are constants; for simplicity, let:

$$\alpha = \sum_{k \in K}\sum_{i \in N_k}\frac{1}{\mu_{i,k}\theta_{i,k}} > 0 \quad \beta = \sum_{k \in K}\sum_{i \in N_k}\frac{\lambda_{i,k}}{\theta_{i,k}} > 0 \qquad (20)$$

Accordingly, (19) can be written as:

$$\sum_{k \in K} D^*_{SP,k} = \sum_{k \in K}\sum_{i \in N_k} D^*_{i,k} = \frac{\pi_{GO}}{2}\alpha - \frac{1}{2}\beta \qquad (21)$$

By substituting (1c), (2), and (21) into (1a), the original GO objective can be reformulated as follows:

$$C_{GO}(D, \pi_{SP}, \pi_{GO}) = a \cdot \left(D_{req} - \sum_{k \in K} D^*_{SP,k}\right)^2 + b \cdot \left(D_{req} - \sum_{k \in K} D^*_{SP,k}\right) + \quad (22)$$

$$c + \pi_{GO} \cdot \sum_{k \in K} D^*_{SP,k}$$

$$= a \cdot \left(D_{req} - \left(\frac{\pi_{GO}}{2}\alpha - \frac{1}{2}\beta\right)\right)^2 +$$

$$b \cdot \left(D_{req} - \left(\frac{\pi_{GO}}{2}\alpha - \frac{1}{2}\beta\right)\right) + c + \pi_{GO} \cdot \left(\frac{\pi_{GO}}{2}\alpha - \frac{1}{2}\beta\right)$$

Next, it is necessary to verify the convexity of the reformulated $C_{GO}$. By taking the first derivative of (22) with respect to $\pi_{GO}$, it can be obtained as:

$$\frac{\partial C_{GO}(D, \pi_{SP}, \pi_{GO})}{\partial \pi_{GO}} = 2a \cdot \left(\left(D_{req} + \frac{1}{2}\beta\right) - \frac{\alpha}{2}\pi_{GO}\right) \cdot \left(-\frac{\alpha}{2}\right) - \quad (23)$$

$$\frac{b}{2}\alpha + \alpha \cdot \pi_{GO} - \frac{\beta}{2}$$

$$= 2a \cdot \left(D_{req} + \frac{1}{2}\beta\right) \cdot \left(-\frac{\alpha}{2}\right) + 2a\left(\frac{\alpha}{2}\right)^2 \pi_{GO} +$$

$$\alpha\pi_{GO} - \frac{b}{2}\alpha - \frac{\beta}{2}$$

$$= -a\alpha\left(D_{req} + \frac{1}{2}\beta\right) + \left(2a\frac{\alpha^2}{4} + \alpha\right)\pi_{GO} - \frac{b}{2}\alpha - \frac{\beta}{2}$$

$$= -a\alpha\left(D_{req} + \frac{1}{2}\beta\right) + \left(\frac{a\alpha^2}{2} + \alpha\right)\pi_{GO} - \frac{b}{2}\alpha - \frac{\beta}{2}$$

Furthermore, the second derivative of $C_{GO}$ in (22) is calculated as follows:

$$\frac{\partial^2 C_{GO}(D, \pi_{SP}, \pi_{GO})}{\partial \pi_{GO}^2} = \frac{a\alpha^2}{2} + \alpha > 0 \quad (24)$$

Therefore, the re-formulated GO objective function in (22) is a strictly convex function of $\pi_{GO}$. Let (23) be equal to zero; then, the global optimal $\pi^*_{GO}$ is determined as follows:

$$\pi^*_{GO} = \frac{a\alpha(2D_{req} + \beta) + b\alpha + \beta}{\alpha(a\alpha + 2)} \quad (25)$$

where $\alpha$ and $\beta$ are defined in (20).

Once the unique and optimal $\pi^*_{GO}$ is determined for the GO, the best strategies ($\pi^*_{SP}$) for all SPs are also ascertained according to (15). Subsequently, all customers enrolled under different SPs will determine their best response strategies ($D^* = [D^*_1, D^*_2, \ldots, D^*_K]$) based on (11). Finally, the profile of strategies ($D^*, \pi^*_{SP}, \pi^*_{GO}$) constitutes the unique SE of the proposed two-loop Stackelberg game, meaning that the proof of Theorem 1 is completed.

Distributed Algorithm for Reaching Se

In part B, the SE is obtained in a centralized way by assuming the GO has all the global information (e.g., $\mu_{i,k}, \theta_{i,k}$ and $\lambda_{i,k}$), which requires an SP to disclose customers' private information. Considering this, a distributed algorithm is more desirable, wherein the optimization can be performed by each SP and the GO independently without disclosing customers' private information.

Algorithm 1 is proposed for this purpose, and the key concept is that the GO iteratively updates $\pi_{GO}$ from $\pi_{GO}^{min}$ to $\pi_{GO}^{max}$; during each iteration, the GO broadcasts $\pi_{GO}$ to every SP, where each SP (k∈K) launches its sub-program with enrolled customers to determine jointly the optimal SP incentive $\pi^*_{SP,k}$ based on (15).

Accordingly, each customer's optimal demand reduction $D^*_{i,k}$ can also be determined using (11). Afterwards, each SP calculates the aggregated demand reduction $D^*_{SP,k}$ via (18) and sends it back to the GO. After aggregating the demand reductions from all SPs, the GO calculates the total procurement cost according to (26) in Algorithm 1 and records the current $\pi_{GO}$ if it results in a lower cost $C_{GO}$.

This process will continue until the conditions in (7), (8), and (9) are satisfied, indicating that the SE has been obtained. It is notable that the cost function $C_{GO}$ of the GO is essentially strictly convex with respect to $\pi_{GO}$ (referring to the theoretical analyses in part B); thus, enumerating $\pi_{GO}$ from $\pi_{GO}^{min}$ to $\pi_{GO}^{max}$ will naturally lead to the minimum cost for the GO, which means Algorithm 1 is always guaranteed to converge to the unique SE.

Algorithm 1: Distributed Algorithm for Reaching SE

1. The GO initializes $\pi^*_{GO}=0$, $C^*_{GO}=C_{Gen}(D_{req})$.

2. The GO repeatedly updates $\pi_{GO}$ by increasing from $\pi_{GO}^{min}$ to $\pi_{GO}^{min}$ with a predetermined step size.

3. Each SP k∈K launches sub-program with enrolled customers. SP k calculates the optimal SP incentive $\pi^*_{SP,k}$ using (15), and then calculates the aggregated demand reduction $D^*_{SP,k}$ of $N_k$ customers using (18). Each SP k sends $D^*_{SP,k}$ back to the GO.

4. The GO calculates the total procurement cost according to following equation (26).

$$C_{GO} = C_{Gen}\left(D_{req} - \sum_{k \in K} D^*_{SP,k}\right) + \pi_{GO} \cdot \sum_{k \in K} D^*_{SP,k} \quad (26)$$

5. If the total procurement cost $C_{GO} \leq C^*_{GO}$, then the GO records the optimal incentive and minimal cost $\pi^*_{GO} = \pi_{GO}$, $C^*_{GO} = C_{GO}$.

6. Repeat 2 to 5.

7. The Stackelberg Equilibrium (SE) ($D^*, \pi^*_{SP}, \pi^*_{GO}$) is obtained.

Referring to FIG. 9 through FIG. 12, detailed descriptions will be made regarding the incentive-based DR method and system according to the present disclosure.

The GO 10, the SP 20, and the customer 30 constitute the incentive-based demand response system. In the demand response system, the GO 10 indicates a GO server, the SP 20 indicates an SP server, and the customer indicates the customer's power management device.

Figure 9:
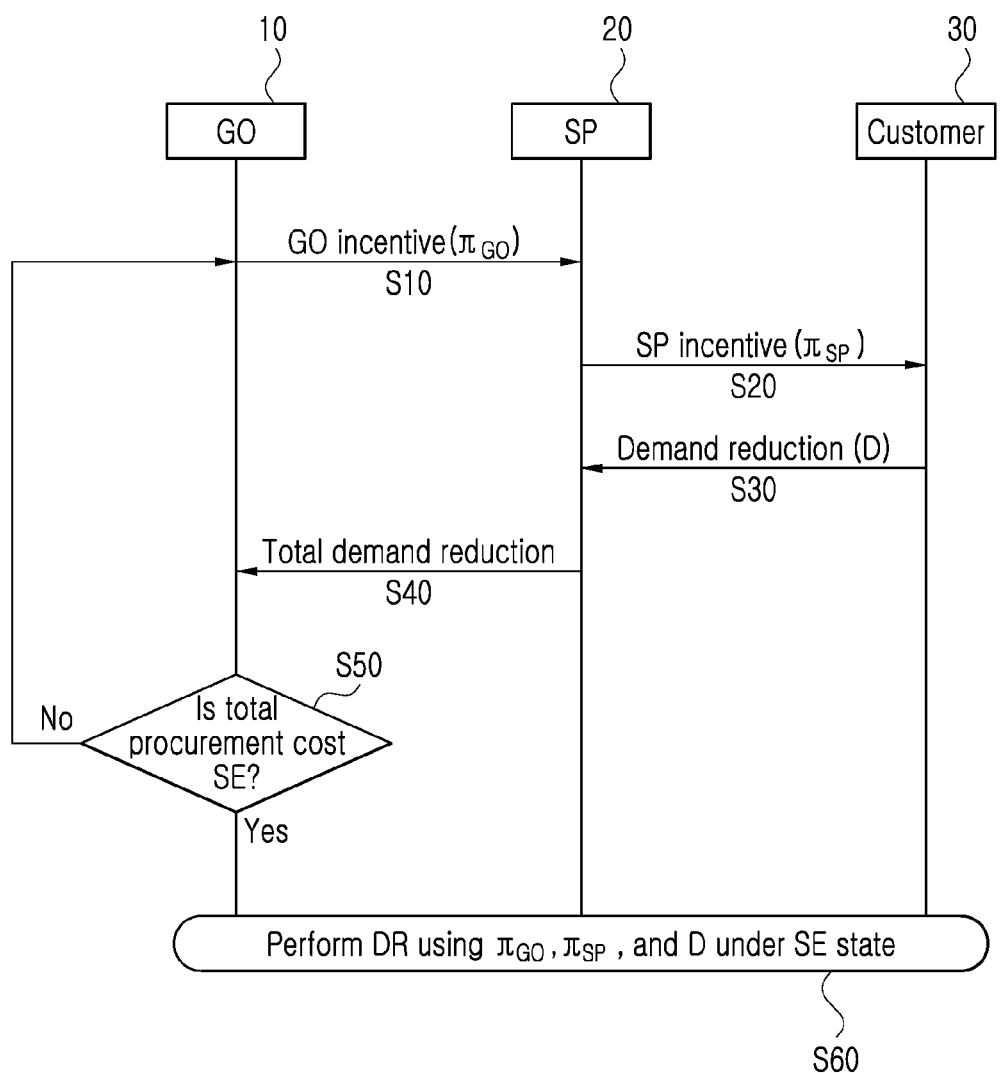
FIG. 9 is a view illustrating a signal flow between each subject in the incentive-based DR system according to the present disclosure.

FIG. 9 is a view illustrating a signal flow between each subject in the incentive-based DR system according to the present disclosure.

In FIG. 9, while only one SP 20 and one customer 30 are illustrated for the convenience, multiple SPs 20 are in service in a real demand response system, and multiple customers are enrolled in each SP 20.

First, the GO 10 sends a GO incentive ($\pi_{GO}$) to the SP 20 when notifying a DR event (S10).

The SP 20, upon receiving the GO incentive from the GO 10, determines an SP incentive ($\pi_{SP}$) using the GO incentive and customer's characteristic data, and sends the determined SP incentive to the customer 30 (S20).

Next, the SP 20 receives a demand reduction (D) which has been calculated based on the SP incentive from each customer.

Here, it is assumed that the SP 20 informs the SP incentive to each customer 30 and receives the demand reduction from the customer 30. However, as described above, the SP 20 may calculate each customer's demand reduction amount based on the SP incentive and customer's characteristic.

When the demand reduction amount of each customer is collected, the SP 20 calculates a total demand reduction amount of all enrolled customer, and returns the total demand reduction amount to the GO 10 (S40).

The GO 10, based on the total demand reduction amount and GO incentive received from each SP 20, calculates a total procurement cost and determines whether the total procurement cost reached the Stackelberg equilibrium where the total procurement cost can no longer be minimized (S50).

When it is determined that the total procurement cost did not reach the Stackelberg equilibrium, the GO 10 updates the GO incentive and sends the updated GO incentive to the SP 20. Here, the GO 10 updates the GO incentive by increasing its value from the minimum value to the maximum value with a predetermined step size.

In the meantime, when it is determined that the procurement cost reached the Stackelberg equilibrium, the demand response is executed according to the GO incentive, SP incentive and total demand reduction amount under the Stackelberg equilibrium state. The GO 10 makes a payment of an incentive cost to the SP 20 based on the total demand reduction amount and GO incentive, and the SP 20 makes a payment of the incentive cost to the customer 30 based on the total demand reduction amount and SP incentive.

Figure 10:
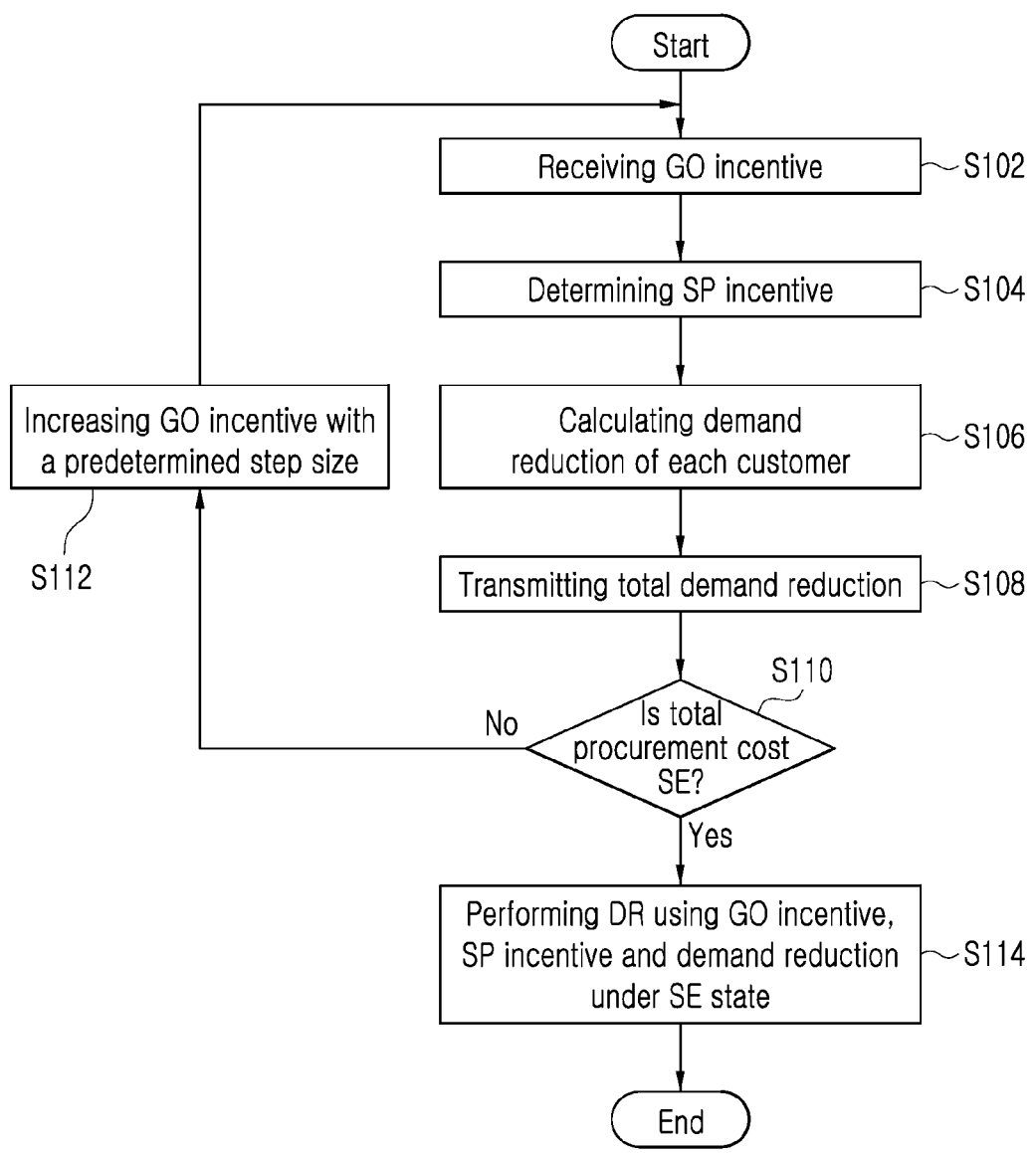
FIG. 10 is a view illustrating the processing procedure of an SP server according to the present disclosure.
Figure 11:
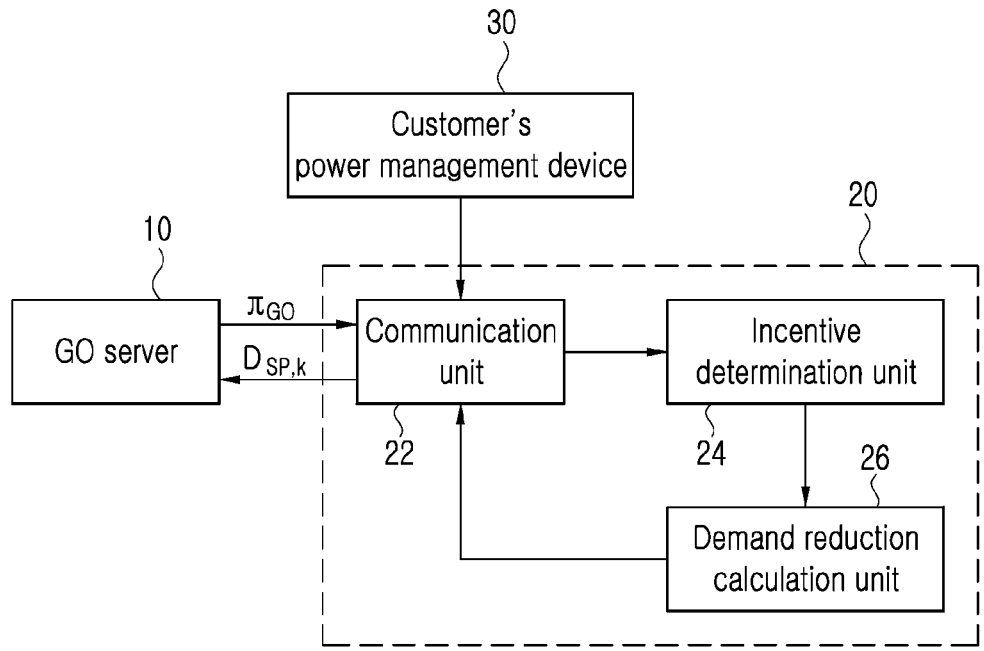
FIG. 11 is a view illustrating an inner configuration of the SP server according to the present disclosure.

FIG. 10 is a view illustrating the processing procedure of an SP server according to the present disclosure, and FIG. 11 is a view illustrating an inner configuration of the SP server according to the present disclosure.

Referring to FIGS. 10 and 11, a communication unit 22 of the SP server 20 receives the GO incentive from the GO server 10.

When the GO incentive is input from the communication unit 22, an incentive determination unit 24 determines the SP incentive based on the GO incentive and customer's characteristic obtained from the customer (S104).

Next, a demand reduction calculation unit 26 calculates the demand reduction of each customer based on the SP incentive and each customer's characteristic (S106), and calculates a total demand reduction amount of all enrolled customer by adding each customer's demand reduction.

When the total demand reduction amount is input from the demand reduction calculation unit 26, the communication unit 22 sends the total demand reduction ($D_{sp,k}$) to the GO server 10 (S108).

Figure 12:
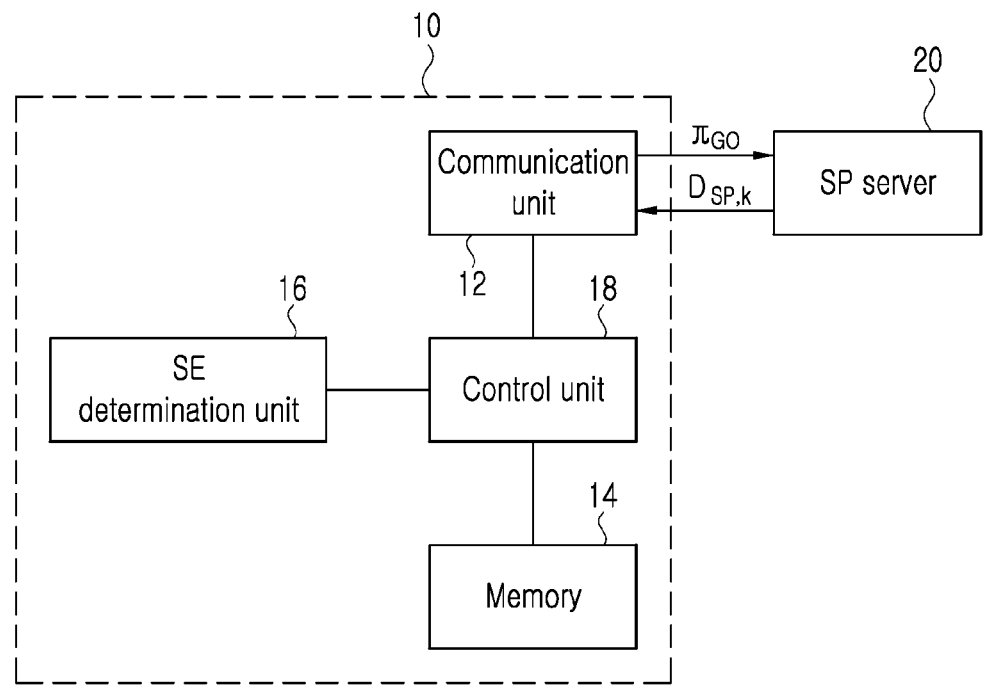
FIG. 12 is a view illustrating an inner configuration of a GO server according to the present disclosure.

Next, referring to FIG. 12, the processing procedure at the side of the GO server 10 will be described.

When the communication unit 12 of the GO server 10 receives the total demand reduction from the SP server 20, the control unit 18 calculates the procurement cost by adding a cost required for an additional power generation which is a shortage amount of resource subtracted by a total demand reduction amount and a cost to be paid to the SP based on the total demand reduction amount and GO incentive.

Next, an SE determination unit 16 determines whether the calculated procurement cost reached the Stackelberg equilibrium where the procurement cost can no longer be minimized (S110).

When it is determined by the SE determination unit 16 that the procurement cost did not reach the Stackelberg equilibrium, the control unit 18 updates the GO incentive by increasing the GO incentive from its minimum to the maximum value with a predetermined step size according to the GP incentive range and step size stored in a memory unit 14 (S112).

The control unit 18 sends the updated GO incentive to the SP 20, and the SP 20 repeats the steps of S102 and S108 while receiving the updated GO incentive.

When it is determined by the SE determination unit 16 that the Stackelberg equilibrium is reached, the demand response is executed according to the GO incentive, SP incentive and demand reduction under the Stackelberg equilibrium state (S114).

IV. Simulation

This section presents the results of numerical analyses and assesses the performance of the proposed incentive-based DR approach. For ease of illustration, the simulation was conducted between one GO, two SPs and six customers, where each SP was assumed to have three enrolled customers. The model presented can incorporate more customers; the reason for considering only six customers in this simulation is to provide clarity in the analysis of the simulation results.

The GO anticipates a system resource deficiency ($D_{req}$) of 49.4 MWh in the upcoming hour. The incentive interval of the GO was set to [$10/MWh, $105/MWh]. For the generation cost function in (2), the parameters took values of a=1.5, b=0.8, and c=0. For each SP, the lower bound of the SP incentive ($\pi_{SP,k}^{min}$) was set to be 0. The upper bound ($\pi_{SP,k}^{max}$) was assumed to be slightly less than the GO incentive ($\pi_{GO}$), namely, by multiplying 0.9 by $\pi_{GO}$, so as to guarantee profit for an SP.

TABLE 1

| | SPs | | | | | |
|---|---|---|---|---|---|---|
| | SP 1 | | | SP 2 | | |
| | Customers | | | | | |
| | Cus 1 | Cus 2 | Cus 3 | Cus 1 | Cus 2 | Cus 3 |
| Tar demand (MW) | 22.8 | 18.7 | 26.1 | 12.2 | 22.9 | 23.1 |
| Min demand (MW) | 11.4 | 11.2 | 11.7 | 6.7 | 9.2 | 13.9 |
| θ | 3.0 | 4.5 | 5.0 | 4.0 | 5.5 | 6.0 |
| λ | 5 | 5 | 5 | 5 | 5 | 5 |
| μ | 0.5, 0.8 or 1.0 | | | 0.5, 0.8 or 1.0 | | |

Table I gives the parameters for each customer, wherein customers were assumed to have different target demands ($D_{i,k}^{tar}$) and minimum demand requirements $D_{i,k}^{min}$). Thus, the available quantities of demand reduction provided by each customer were also different. Moreover, customers were assigned different $\theta_{i,k}$ to represent their individual attitude towards providing load reduction. For the weight factor ($\mu_k$) of the dissatisfaction cost, it was assumed that each customer took the same weight at a time, for example, 0.5, 0.8, or 1.

It is important to point out that all parameter values are particular to this embodiment, and that they may vary according to the specific design of a local electricity market, the generation configuration, and customer characteristics. However, this does not distort the analysis and interpretation of the results. Algorithm 1 in Section III was carried out on the simulation scenario configured above, to seek the SE in a distributed fashion, where the step size for increasing $\pi_{GO}$ during each iteration was set at $5.0/MWh. Next, the performance of the proposed incentive-based DR approach was examined from various aspects.

Performance

Figure 3:
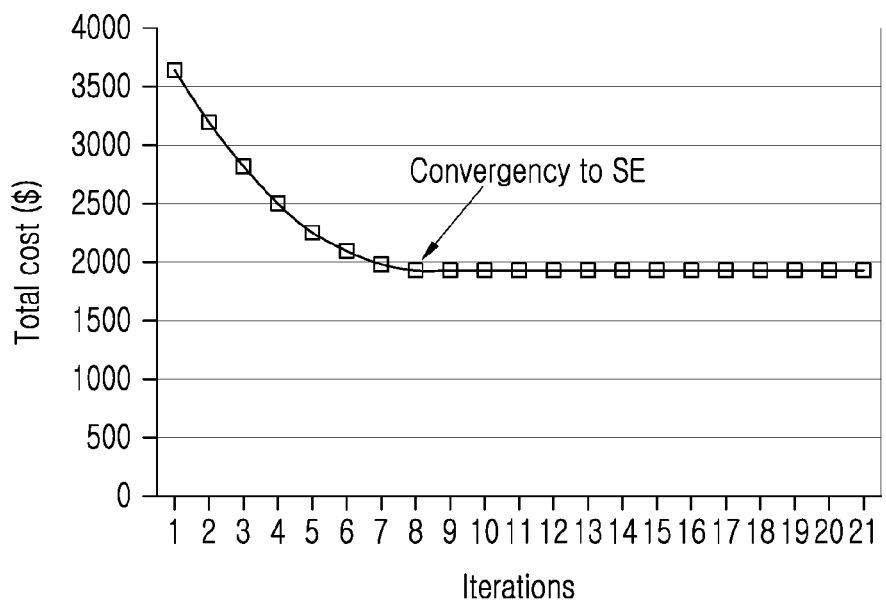
FIG. 3 is a view illustrating that Algorithm 1 converges on the Stackelberg equilibrium according to the present disclosure.
Figure 3:
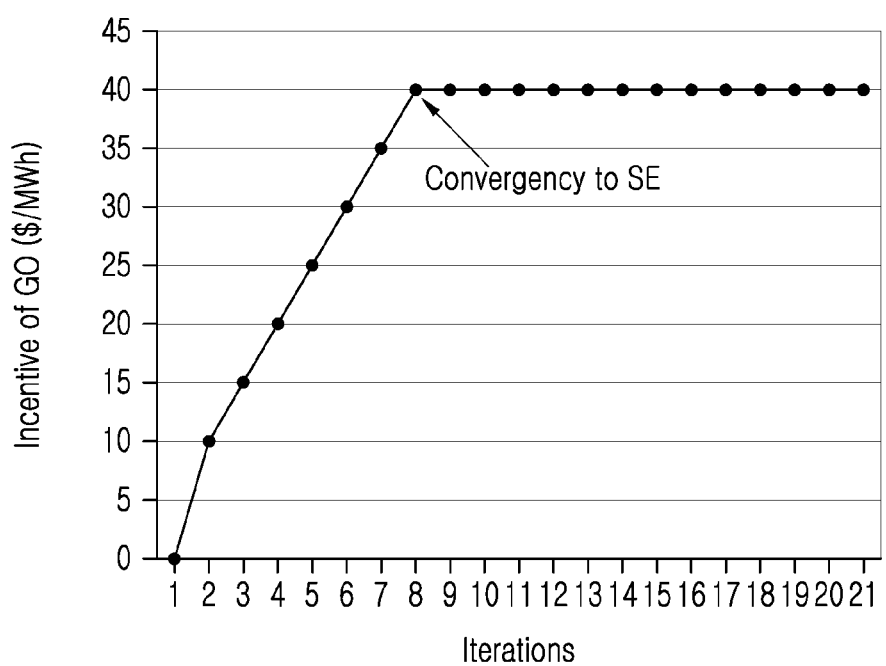
Figure 4:
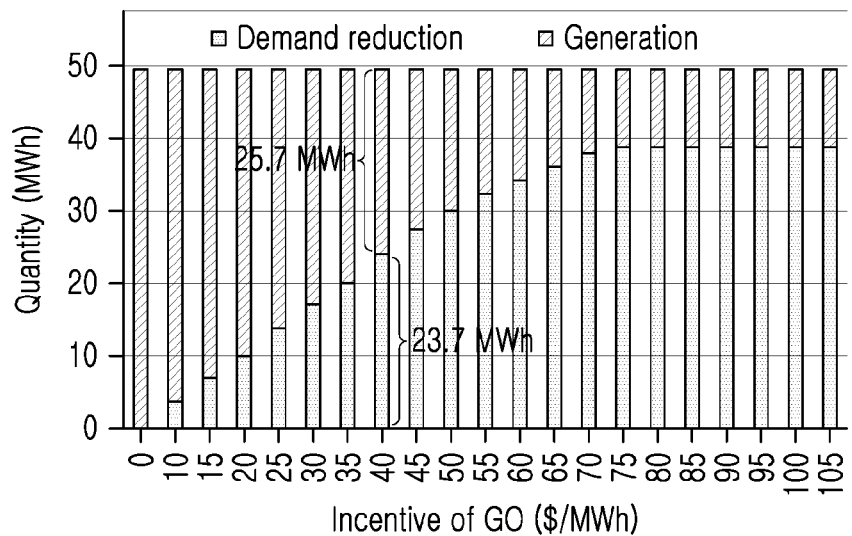
FIG. 4 is a view illustrating an optimum demand reduction amount from a generation amount according to the GO incentive and two SPs.
Figure 5:
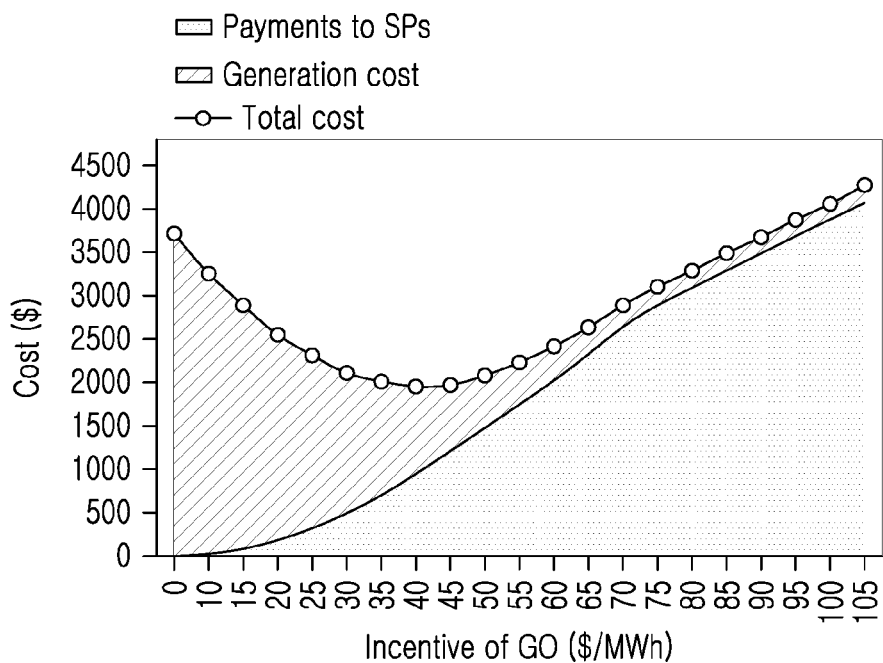
FIG. 5 is a view illustrating a total cost divided into a cost to be paid to SP and a generation cost.

FIG. 3 plots the procedure for Algorithm 1 to reach the SE. It was found that the algorithm converged at the eighth iteration, where the total cost of the GO cannot decrease further (left figure), and the corresponding optimal incentive was $40/MWh (right figure). To gain an intuitive interpretation on how the GO coordinates the actions of SPs and customers, FIG. 4 traces the aggregated demand reduction and generation quantities with regard to varying GO incentives, and FIG. 5 shows a decomposition of the cost of GO payments to SPs and the generation cost of running generators. Specifically, the following implications are obtained:

a) When offered a low $\pi_{GO}$ (e.g., $10/MWh), the demand side was reluctant to respond to such a low incentive and therefore provided little load reduction, as shown in FIG. 4. As a consequence, the GO had to run expensive generators to make up the major resource deficiency, resulting in quite high generation cost, as shown in FIG. 5.

b) As $\pi_{GO}$ increased (e.g., $20/MWh), more load reduction was procured from the demand side (see, e.g., FIG. 4), which caused a slight increase in payments to SPs but an apparent decrease in the total cost, since the generation cost was significantly reduced, as seen in FIG. 5.

c) When providing a $\pi_{GO}$ higher than $40/MWh (i.e., the optimal incentive at the SE), the total cost would not decrease any further but started to increase. The reason for this is that, even though a higher $\pi_{GO}$ was able to induce more demand reduction, as shown in FIG. 4 and FIG. 5, at the same time the incentive payments to SPs also increased quickly, which became a new burden for the GO.

d) It is notable that, from $\pi_{GO}$=$75/MWh, even though more incentive payments were paid to the demand side, the quantities of demand reduction and generation remained unchanged, as shown in FIG. 4. This was because customers under the subscription of each SP were not willing to reduce their load further after making a compromise between the incentive income and incurred dissatisfaction, as implied in (5a).

Financila Analyses of GO, SPs, and Customers

For incentive-based DR approaches, it is important to maintain the financial balance of the resource trading process. In accordance with this, Table II provides the financial analyses of the proposed approach at the system optimal solution, namely, the unique Stackelberg equilibrium (D*, $\pi^*_{SP}, \pi^*_{GO}$) resulting in minimal procurement cost for the GO.

TABLE II

| GO | Numerical Value |
| --- | --- |
| Optimal GO incentive ($/MWh) | 40 |
| Total procurement cost ($) | 1956.6 |
| Total demand reduction (MWh) | 23.7 |
| Total generation (MWh) | 25.7 |
| GO payment to SPs ($) | 948 |
| Generation cost ($) | 1008.6 |

| SPs | SP 1 | SP 2 |
| --- | --- | --- |
| SP incentive ($/MWh) | 22.5 | 22.5 |
| Demand reduction of each SP (MWh) | 13.22 | 10.48 |
| SP revenue ($) | 528.8 | 419.2 |
| SP payment to customers ($) | 297.5 | 235.8 |
| SP profit ($) | 231.4 | 183.3 |

| | Customers | | | | | |
| --- | --- | --- | --- | --- | --- | --- |
| | Cus 1 | Cus 2 | Cus 3 | Cus 1 | Cus 2 | Cus 3 |
| Optimal demand reduction (MWh) | 5.83 | 3.89 | 3.5 | 4.38 | 3.18 | 2.92 |
| Income of each customer ($) | 131.2 | 87.5 | 78.75 | 98.55 | 71.55 | 65.7 |
| Sum of customers' income ($) | 297.5 | | | 235.8 | | |

The optimal SP incentives and optimal demand reduction of each (or a group of) customer(s) are also provided to help interpret the following analyses. Specifically, the GO payment to SPs was calculated based on the first term of (3a) and the generation cost was calculated using (2). The SP payment to customers was calculated by multiplying the SP incentive by the aggregated demand reduction. Table II also lists the profit of each SP as a speculator, which is actually the utility of an SP (i.e., the SP utility function in (3a)) gained through trading price differences with the GO and customers. In another way, the profit of an SP can also be regarded as the net revenue after eliminating the payment to customers from the gross revenue obtained by trading with the GO. For each respective customer, the optimal demand reduction as well as the corresponding income are also provided in Table II, where the income was calculated based on the first term of (5a).

It can be seen that the sum of GO payments to SPs and the generation cost equals the total procurement cost. From the view of SPs, the sum of each SP's payments to customers and its respective profit was exactly the same as the payment made to the GO. Moreover, the total income of customers subscribed to the same SP was equal to the payment made by each SP. Therefore, the financial balance over the whole resource trading framework was maintained.

Comparison of Cost with Respect to Benchmark

Figure 6:
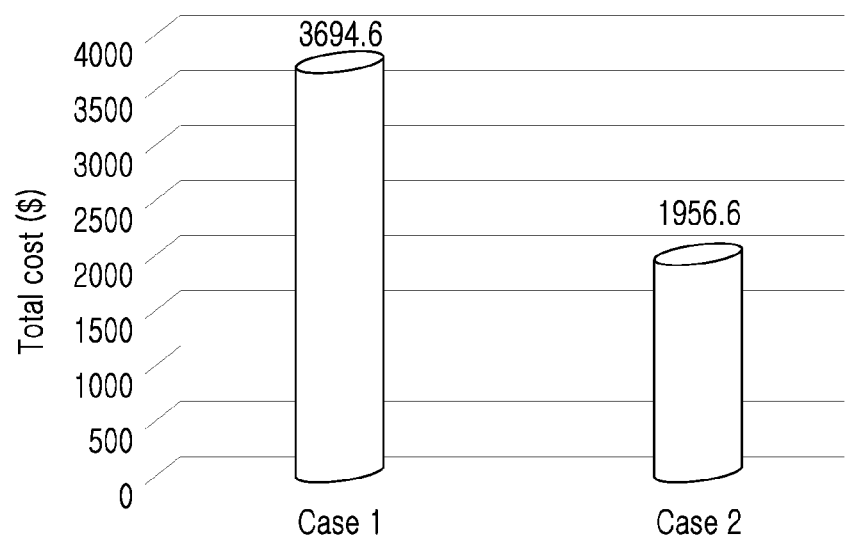
FIG. 6 is a view illustrating a cost comparison.

To confirm the superiority of the proposed approach, a benchmark (Case 1) was proposed, where the resource deficiency was compensated only by running generators, in which case the cost was calculated using (2) alone. FIG. 6 shows that the cost in Case 2 (the proposed approach) was reduced by 47% in comparison to Case 1.

Truthfulness of Players

Figure 7:
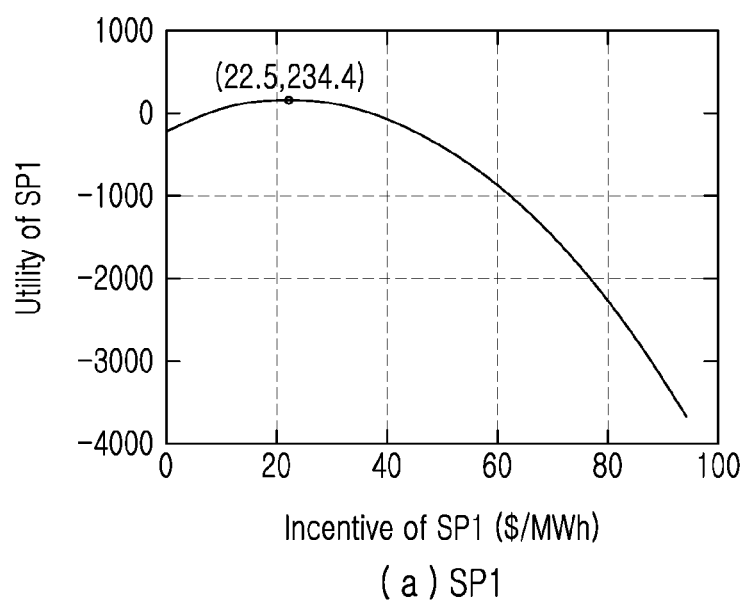
FIG. 7 is a view illustrating a value of the utility function of SP with respect to a strategy (SP incentive)
Figure 7:
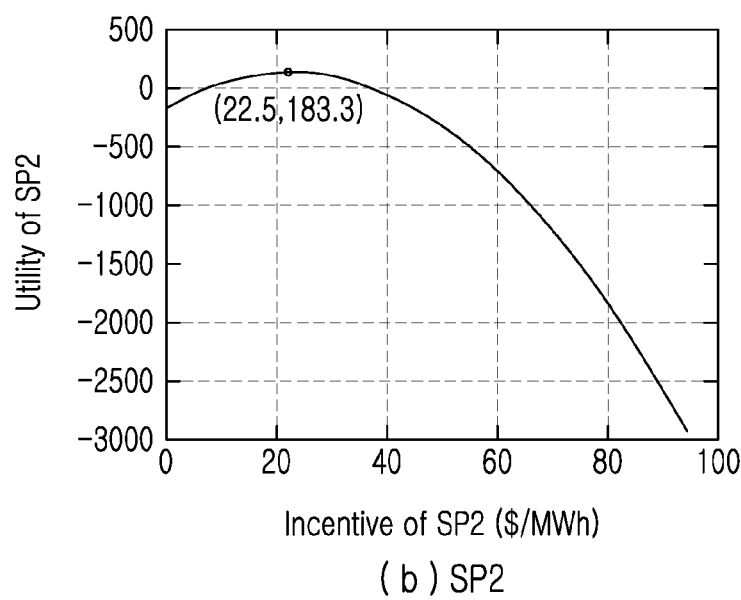
Figure 8:
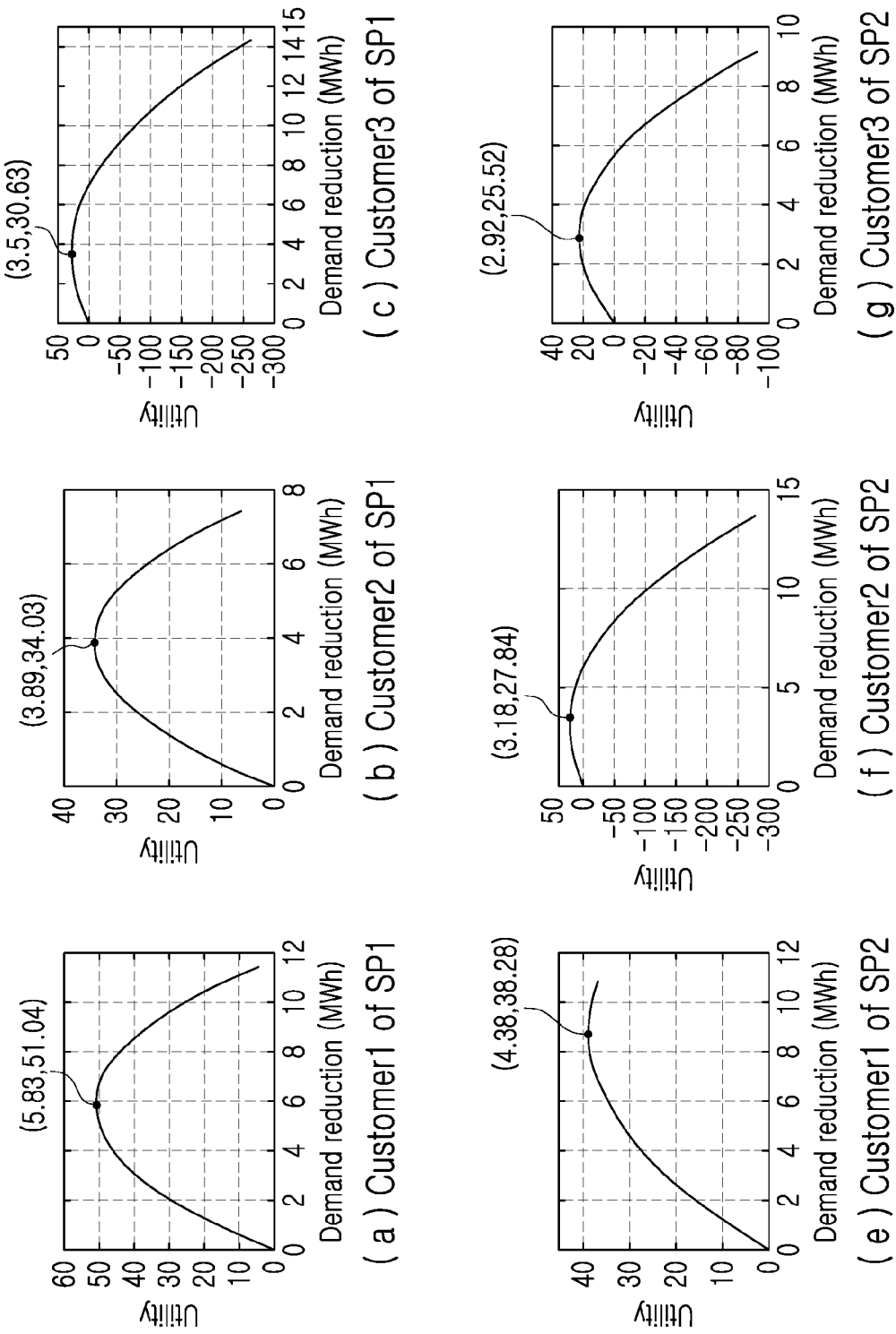
FIG. 8 is a view illustrating a value of the utility function of of each customer with respect to a strategy (demand reduction)

Over the Stackelberg equilibrium—SE (D*,$\pi^*_{SP},\pi^*_{GO}$), the GO is concerned whether SPs and their customers will deviate from their current strategies; this is referred to as the "truthfulness" of the players. FIG. 7 shows the utility function value of each SP in the form of (13) with respect to various incentives; the optimal incentive of each SP and the related utility value at the equilibrium are marked by diamonds. Considering that the utility of an SP actually represents the profit (refer to (3a)) gained through trading price differences between the GO and customers, clearly the profits of two SPs will decrease and even become negative if other incentives are chosen. In addition, the utility value of each customer is plotted as a function of various demand reduction quantities in FIG. 8. The demand reduction quantities of customers under each SP and the utility values at the equilibrium are marked by stars and circles, respectively. It can be seen that the utility of each customer will degrade if other strategies are chosen. Therefore, it is concluded that each player cannot increase its own utility by choosing a different strategy, which means the SE provides the optimal solution for the presented approach, and no SP or customer is motivated to violate the current equilibrium strategy.

In the meantime, the method of the incentive-based demand response may be implemented with software programs to be stored in a computer-readable storage medium. For example, the storage medium may be a built-in device such as a hard disk (HD), flash memory, RAM, ROM, or an external device such as an optical disk (e.g., CD-R, CD-RW), compact flash card, smart media, memory stick multimedia card.

The functional operation and embodiments described in the present disclosure may be implemented with digital electronic circuits, computer software, firmware or hardware, or one or more combination thereof. Also, the embodiments described in the present disclosure may be implemented with one or more computer products, that is, one or more modules regarding the commands of the computer program encoded in a tangible storage medium for a control of the operation of the data processing devices or an execution by the data processing devices.

The drawings of the present disclosure describe the operation process. This does not necessarily indicate that the operations need to be executed in that order or all of the operations are executed in order to obtain a desired result. In a specific case, a multi-taking and a parallel tasking may be advantageous.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An incentive-based demand response method in a demand response system including a grid operator, a plurality of service providers, and a plurality of customers enrolling each service provider, the method comprising:

a first step of updating, by a control unit of the grid operator, an incentive of the grid operator and transmitting, by a communication unit of the grid operator, the incentive of the grid operator that has been updated to the plurality of service providers;

a second step of determining, by an incentive determination unit of each of the plurality of service providers, an incentive of at least one of the plurality of service providers based on the incentive of the grid operator and a characteristic of customers of a respective service provider among the plurality of service providers;

a third step of determining, by a demand reduction calculation unit of each of the plurality of service providers, a demand reduction of each customer of the respective service provider based on the incentive of the service provider and transmitting, by a communication unit of each of the plurality of service providers, a total demand reduction of subscription customers of its own to the grid operator;

a fourth step of calculating, by the control unit of the grid operator, a total procurement cost based on a total demand reduction received from the plurality of service providers and the incentive of the grid operator; and a fifth step of determining, by a Stackelberg equilibrium (SE) determination unit of the grid operator, whether the total procurement cost reached a Stackelberg equilibrium state;

when it is determined by the SE determination unit of the grid operator that the total procurement cost did not reach the Stackelberg equilibrium state, repeating the first to fifth steps, and when it is determined by the SE determination unit of the grid operator that the total procurement cost reached the Stackelberg equilibrium state, performing a demand response by utilizing the incentive of grid operator, the incentive of service provider, and the total demand reduction under the Stackelberg equilibrium state.

2. The incentive-based demand response method according to claim 1, wherein the first step includes increasing, by the control unit of the grid operator, the incentive of the grid operator beginning from a minimum value to a maximum value with a predetermined step size.

3. The incentive-based demand response method according to claim 1, wherein the second step included determining, by the incentive determination unit of each of the plurality of service providers, the incentive of service provider based on an equation represented by $$\pi_{SP,k}^* = \frac{1}{2}\pi_{GO} + \frac{1}{2}\frac{\sum_{i \in N_k} \frac{\lambda_{i,k}}{\theta_{i,k}}}{\sum_{i \in N_k} \frac{1}{\mu_{i,k}\theta_{i,k}}}.$$

4. The incentive-based demand response method according to claim 1, wherein the third step includes determining, by the demand reduction calculation unit of each of the plurality of service providers, the demand reduction of each of its own customers based on an equation represented by $$D_{i,k} = \frac{\pi_{SP,k} - \mu_{i,k}\lambda_{i,k}}{\mu_{i,k}\theta_{i,k}},$$

and calculates the total demand reduction of subscription customers of its own based on an equation represented by $$D_{SP,k}^* = \sum_{i \in N_k} D_{i,k}^*$$
$$= \frac{\pi_{GO}}{2}\sum_{i \in N_k}\frac{1}{\mu_{i,k}\theta_{i,k}} + \frac{1}{2}\sum_{i \in N_k}\frac{\lambda_{i,k}}{\theta_{i,k}}\sum_{i \in N_k}\frac{1}{\mu_{i,k}\theta_{i,k}} \cdot$$
$$\sum_{i \in N_k}\frac{1}{\mu_{i,k}\theta_{i,k}} - \sum_{i \in N_k}\frac{\lambda_{i,k}}{\theta_{i,k}}$$
$$= \frac{\pi_{GO}}{2}\sum_{i \in N_k}\frac{1}{\mu_{i,k}\theta_{i,k}} - \frac{1}{2}\sum_{i \in N_k}\frac{\lambda_{i,k}}{\theta_{i,k}}$$

5. The incentive-based demand response method according to claim 1, wherein the fourth step includes calculating, by the control unit of the grid operator, the total procurement cost based on an equation represented by $$C_{GO} = C_{Gen}\left(D_{req} - \sum_{k \in K} D^*_{SP,k}\right) + \pi_{GO} \cdot \sum_{k \in K} D^*_{SP,k}.$$

6. An incentive-based demand response system comprising:
   a grid operator server for updating an incentive of a grid operator and sending an updated incentive of the grid operator; and
   a plurality of service provider servers for determining an incentive of service providers based on the incentive of the grid operator received from the grid operator server and a characteristic of customers of the service providers,
   wherein when each of the plurality of service provider servers determines a demand reduction of each customer of a respective service provider and sends a total demand reduction of enrolling customers of the respective service provider to the grid operator server, the grid operator server calculates a total procurement cost based on the total demand reduction received from the plurality of service provider servers and the incentive of grid operator, and determines whether the total procurement cost reached a Stackelberg equilibrium state.

7. The incentive-based demand response system according to claim 6, wherein when the total procurement cost did not reach the Stackelberg equilibrium state, the grid operator server updates the incentive of grid operator and sends an updated incentive of the grid operator to the plurality of service provider servers, and
   wherein when the total procurement cost reaches the Stackelberg equilibrium state, the grid operator server performs a compensation for a demand response by using the incentive of grid operator under the Stackelberg equilibrium state.

* * * * *